US 8,266,116 B2
Sep. 11, 2012

(12) United States Patent
Agarwal et al.

(10) Patent No.: US 8,266,116 B2
(45) Date of Patent: Sep. 11, 2012

(54) METHOD AND APPARATUS FOR DUAL-HASHING TABLES

(75) Inventors: Puneet Agarwal, Cupertino, CA (US); Eric Baden, Saratoga (CA); Jeff Dull, San Jose, CA (US); Bruce Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 719 days.

(21) Appl. No.: 11/845,997

(22) Filed: Aug. 28, 2007

(65) Prior Publication Data

US 2008/0229056 A1 Sep. 18, 2008

Related U.S. Application Data

(60) Provisional application No. 60/906,621, filed on Mar. 12, 2007.

(51) Int. Cl.
*G06F 17/00* (2006.01)

(52) U.S. Cl. .................. 707/693; 707/719; 711/216

(58) Field of Classification Search .............. 707/802, 707/803, 693, 695, 706, 719; 711/216
See application file for complete search history.

(56) References Cited

U.S. PATENT DOCUMENTS

| 5,542,089 A | | 7/1996 | Lindsay et al. | |
|---|---|---|---|---|
| 5,692,178 A | * | 11/1997 | Shaughnessy | 707/802 |
| 5,706,462 A | | 1/1998 | Matousek | |
| 5,809,495 A | * | 9/1998 | Loaiza | 707/803 |
| 5,873,074 A | * | 2/1999 | Kashyap et al. | 707/803 |
| 5,893,086 A | * | 4/1999 | Schmuck et al. | 707/706 |
| 5,978,793 A | * | 11/1999 | Kashyap et al. | 707/802 |
| 6,009,432 A | * | 12/1999 | Tarin | 707/797 |
| 6,044,369 A | * | 3/2000 | Black | 707/802 |
| 6,052,697 A | * | 4/2000 | Bennett et al. | 707/804 |
| 6,073,129 A | * | 6/2000 | Levine et al. | 707/716 |
| 6,272,503 B1 | * | 8/2001 | Bridge et al. | 711/202 |
| 6,381,594 B1 | * | 4/2002 | Eichstaedt et al. | 709/201 |
| 6,446,062 B1 | * | 9/2002 | Levine et al. | 707/690 |
| 6,513,041 B2 | * | 1/2003 | Tarin | 707/803 |
| 6,633,879 B1 | * | 10/2003 | Jeffries | 707/719 |
| 6,633,885 B1 | * | 10/2003 | Agrawal et al. | 715/764 |
| 6,769,001 B2 | * | 7/2004 | Halstead et al. | 707/812 |
| 6,804,677 B2 | * | 10/2004 | Shadmon et al. | 707/752 |
| 6,871,201 B2 | * | 3/2005 | Yu et al. | 707/797 |

(Continued)

OTHER PUBLICATIONS

Broder, A. Z., et al., "Multilevel Adaptive Hashing", Proc. 1st Annual ACM-SIAM Symposium on Discrete Algorithms, (1990), pp. 43-53.

*Primary Examiner* — Shahid Alam
(74) *Attorney, Agent, or Firm* — Brake Hughes Bellermann LLP

(57) ABSTRACT

Methods and apparatus for dual hash tables are disclosed. An example method includes logically dividing a hash table data structure into a first hash table and a second hash table, where the first hash table and the second hash table are substantially logically equivalent. The example method further includes receiving a key and a corresponding data value, applying a first hash function to the key to produce a first index to a first bucket in the first hash table, and applying a second hash function to the key to produce a second index to a second bucket in the second hash table. In the example method the key and the data value are inserted in one of the first hash table and the second hash table based on the first index and the second index.

16 Claims, 5 Drawing Sheets

U.S. PATENT DOCUMENTS

| | | | |
|---|---|---|---|
| 6,915,302 B1 * | 7/2005 | Christofferson et al. | 707/803 |
| 6,950,834 B2 * | 9/2005 | Huras et al. | 707/610 |
| 7,031,985 B1 * | 4/2006 | Pecheny | 707/802 |
| 7,039,658 B2 * | 5/2006 | Starkey | 715/206 |
| 7,043,494 B1 * | 5/2006 | Joshi et al. | 707/803 |
| 7,058,639 B1 * | 6/2006 | Chatterjee et al. | 711/216 |
| 7,096,421 B2 * | 8/2006 | Lou | 715/234 |
| 2002/0073068 A1 | 6/2002 | Guha | |
| 2003/0218978 A1 | 11/2003 | Brown | |
| 2006/0212945 A1 * | 9/2006 | Donlin et al. | 726/29 |
| 2006/0288030 A1 * | 12/2006 | Lawrence | 707/803 |

* cited by examiner

METHOD AND APPARATUS FOR DUAL-HASHING TABLES

CROSS REFERENCE TO RELATED APPLICATIONS

This application claims the benefit under 35 U.S.C. §119 (e) of U.S. Provisional Patent Application Ser. No. 60/906,621, filed on Mar. 12, 2007. The entire disclosure of U.S. Provisional Application 60/906,621 is incorporated by reference herein in its entirety.

TECHNICAL FIELD

This disclosure relates to hashing tables for storing indexed data.

BACKGROUND

Associative data structures are used in numerous computing and networking applications to store electronic data. For example, in network applications, an associative data structure may be used to store a table of information (data values) that includes data corresponding with various entities operating in a network. Such data values may be stored using keys, such as an address or a particular network entity. The data values are typically associated with the keys, or network addresses in the associative data structure. Such network addresses (keys) may take the form of Media Access Controller (MAC) addresses, Ethernet addresses, Internet Protocol (IP) addresses, or any other appropriate identifying information that may be used as a key to identify, or associate a particular data value with a respective network entity.

Such associative data structures may be "fully-associative" or "set-associative." An example of a fully associative data structure is content addressable memories (CAMs). In a CAM, data values are indexed using a complete key, such as an entire MAC address, for example. Because CAM structures are fully associative, they may operate with one-hundred percent utilization. One-hundred percent utilization, in this context, means that a CAM structure with N entries will store the first N entries received by the CAM for entry without a "miss" or insertion failure occurring.

While CAMs may operate with one-hundred percent utilization, they are expensive to implement and complex to design. For instance, CAMs may consume a large amount of dynamic power and semiconductor area in integrated circuit applications and include complex circuitry for accessing their entries as compared to other types of associative data structures, such as set-associative data structures.

One example of a set-associative data structure is a hash table. In hash tables, data values are indexed based on the result of a hash function that may be applied to the corresponding keys for the data values. The hash function produces an index (which has fewer bits than the key) in a given set of indexes to a "bucket" of the hash table. Each bucket of the hash table includes a certain number of entries and each bucket generally has the same number of entries. Hash tables may be referred to as set-associative because each bucket may include a set of data values with keys that "hash" to the same index. The keys and data values may then be stored (and later read from) the bucket of the hash table corresponding with the index produced by applying the hash function to the key. Because the range of indices produced by a hash function is typically predetermined fixed (as compared to network addresses used as keys) the circuitry for accessing the entries of a hash table may be substantially less complex than corresponding circuitry in a CAM.

Because hash tables store keys and data values based on indexes that have fewer bits than the keys, if follows that multiple keys will hash to the same index. Accordingly, collisions may occur in a hash table. A collision occurs, for example, when an attempt is made to insert a data value in a hash table in a bucket that is full (i.e., all entries in the bucket have previously stored data values). Accordingly, unlike fully-associative data structures, hash tables do not operate with one-hundred percent utilization.

Two common measures of utilization efficiency for hash tables are first miss utilization (FMU) and address insert utilization (AIU). FMU is a measure of the number of entries that a hash table stores before the first collision or miss occurs (i.e., a data value fails to get stored in the hash table). For instance, if a hash table has N entries and F entries are stored in the hash table before the first miss occurs, the FMU of the hash table may be expressed as F/N. As an example, assuming random keys are inserted, a hash table with 2 k entries (2048 entries) in 256 buckets (i.e., with eight entries per bucket) may operate with a mean FMU of 34%. If other patterns of keys are used (e.g., non-random) the utilization efficiencies may vary as compared to those for random keys.

AIU is a measure of overall utilization of a hash table. For instance, in a hash table that has N entries, if N attempts are made to insert entries in the hash table and M of those entries are successfully stored in the hash table (i.e., N–M misses occur), the AIU for the hash table may be expressed as M/N. Using the same example as above (a 2 k hash table with 256 buckets and eight entries per bucket), such a hash table may operate with a mean AIU of 86% assuming random keys are inserted.

It will be appreciated that utilization numbers for hash tables may vary depending on a number of factors, such as the particular arrangement of the hash table and the hash function, among any number of other factors. The utilization numbers referenced above are given by way of example for purposes of illustration and comparison.

Depending on the particular embodiment, a hash table with an FMU on the order of 35% may not be sufficient for satisfactory operation of a system in which the hash table is used. Likewise, in other applications, a hash table with an AIU on the order of 85% may not be sufficient. Furthermore, using a fully-structure in place of a hash table in such situations may not be a cost effective solution due the design complexity and physical size of such data structures.

SUMMARY

The details of one or more systems and methods for storing indexed data are disclosed, substantially as shown in and/or described in connection with the accompanying drawings and the description below. Other features will be apparent from the description and drawings, and from the claims.

DETAILED DESCRIPTION

Figure 1:
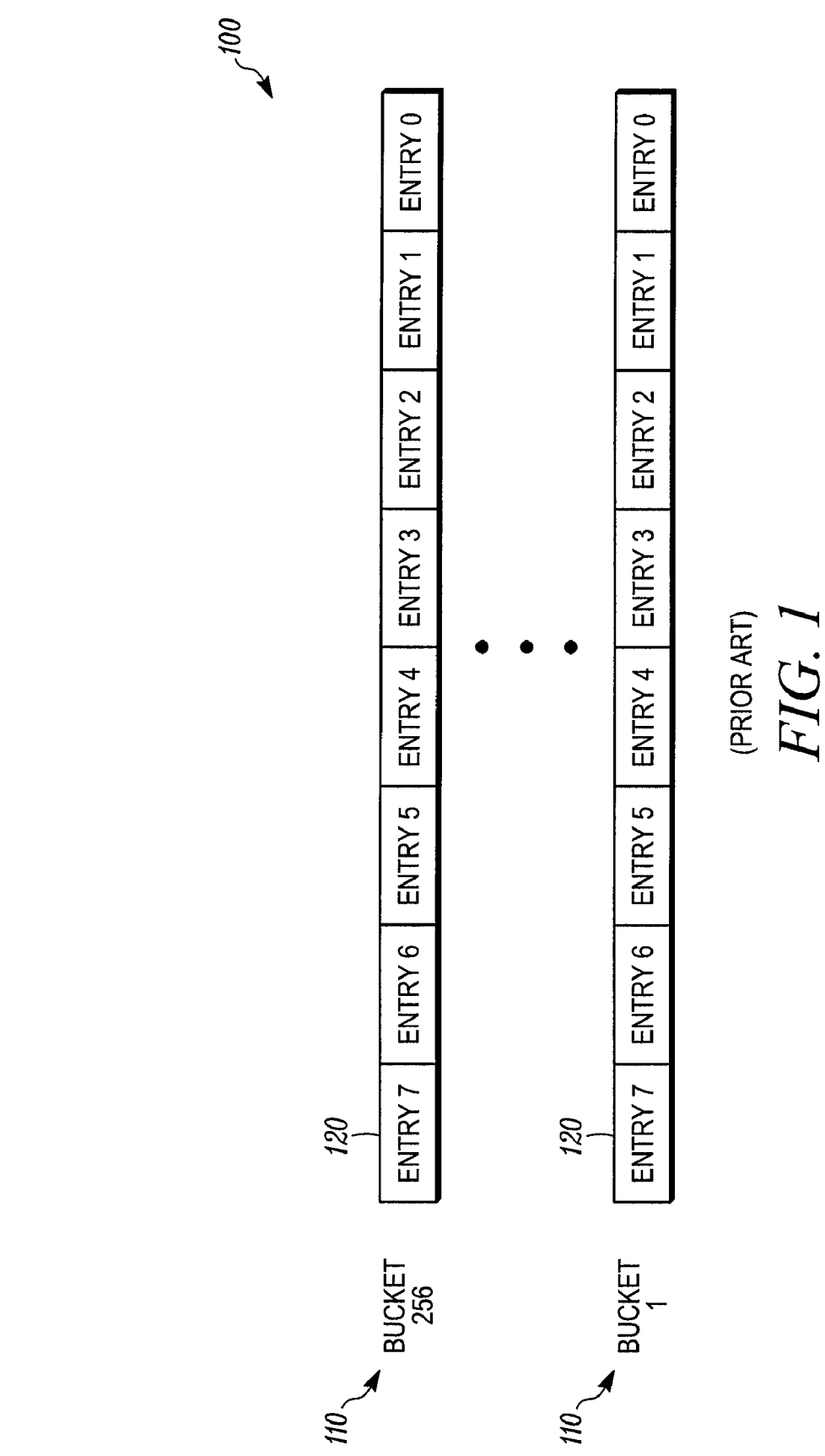
FIG. 1 is a block diagram illustrating an embodiment of a current hash table data structure.

FIG. 1 is a block diagram of a conventional hash table data structure 100. In accordance with the example discussed above, the hash table 100 includes 2 k entries 120 (2048 entries), has 256 buckets 120 with eight entries per bucket (designated ENTRY0 through ENTRY7 for each bucket). A standard hash function, such as a CRC32 or CRC16 hash function may be used to generate indexes for storing and/or accessing entries in the hash table 100. When storing data values in the entries 120 of the buckets 110, new entries may be inserted in a right-to-left fashion, for example. Of course, other approaches may be employed when storing entries in the hash table 100.

As was discussed above, the hash table 100 may operate with a mean first miss utilization (FMU) of approximately 35% and a mean address insert utilization (AIU) of approximately 85%. Depending on the particular embodiment, such utilization efficiencies may be inadequate.

Figure 2:
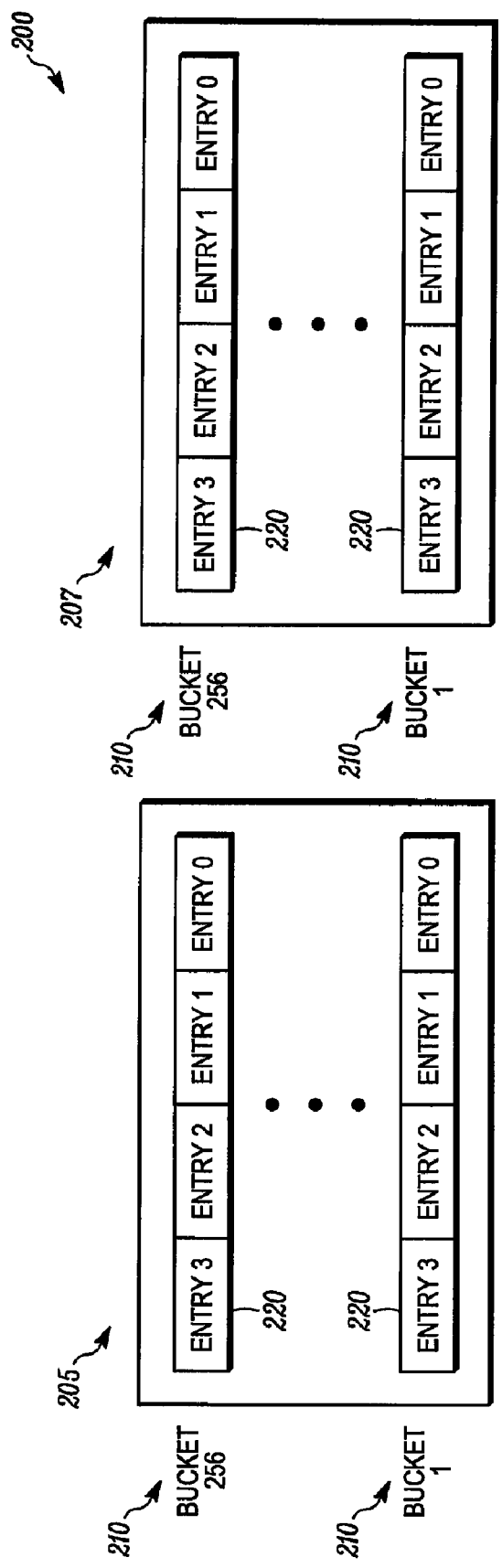
FIG. 2 is a block diagram illustrating an embodiment of a dual hash table.

An approach that may improve the utilization efficiencies of the hash table 100 is to implement the hash table 100 as a dual hash table. FIG. 2 illustrates a block diagram of a dual hash table 200. The dual hash table 200 may be implemented by logically dividing a larger hash table (e.g., the hash table 100) into a first logical hash table 205 and a second logical hash table 207. As with the hash table 100, the dual hash table includes 2 k entries. Also, there are 256 buckets in each logical hash table 205 and 207. However, each logical hash table 205 and 207 has four entries per bucket, as compared to eight entries per bucket in the hash table 100.

A hash table, such as the hash table 100, may be logically divided to implement the dual hash table 200 in any number of ways. For instance, a hash table may include circuitry that is adapted to logically divide the hash table into the logical hash tables of the dual hash table 200. As another example, a hash table may be logically divided (to implement the dual hash table 200) using software and/or firmware. Of course, other approaches for implementing a dual hash table are possible.

Figure 3:
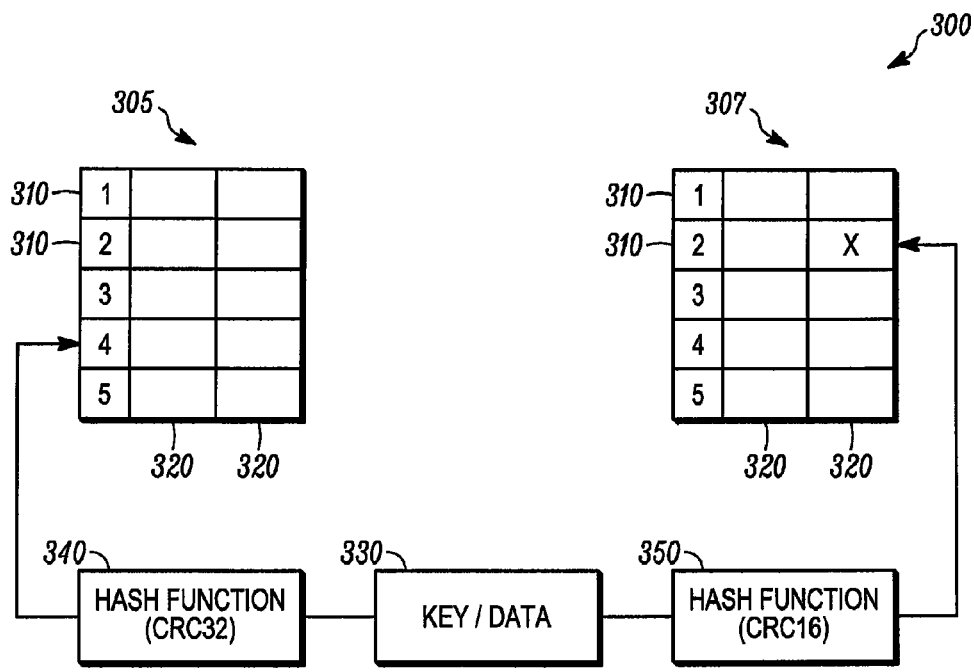
FIG. 3 is a block diagram illustrating an example approach for insertion of an entry into a dual hash table.

FIG. 3 is a block diagram illustrating a technique for inserting an entry in a dual hash table 300. In similar fashion as the dual hash table 200, the dual hash table 300 includes a first logical hash table 305 and a second logical hash table 307. For simplicity in this example, each logical hash table 305 and 307 includes five buckets 310 with two entries 320 per bucket. Accordingly, the dual hash table 300 has twenty total entries. For purposes of this example, the right-most entry of bucket 2 in the logical hash table 307 includes a previously stored entry.

To insert an entry in the dual hash table 300, a key and data value 330 is provided to the dual hash table 300. The key and data value 330 may be provided by any number of sources, such as a network entity or other device. The dual hash table 300 applies a first hash function 340 (e.g., a CRC32 hash function) to the key and applies a second hash function 350 (e.g., a CRC hash function) to the key, where the second hash function 350 is substantially mathematically orthogonal to the first hash function 340. The CRC32 and CRC16 hash functions are given by way of example and any number of other orthogonal hash functions may be used.

The use of orthogonal hash functions may result in improved utilization efficiency of a dual hash table as compared to a single hash table with the same number of entries and buckets. Such utilization improvements may be realized due to the fact that keys which all hash to a single bucket in one of the logical hash tables (e.g., logical hash table 305 or 307) of a dual hash table will most likely hash to different buckets in the other hash table (e.g., logical hash table 307 or 305) when using hash functions that are orthogonal. Accordingly, such an approach may reduce the likelihood of a collision (insertion failure) and, therefore, may improve the FMU and AIU of a dual hash table as compared to the FMU and AIU of a corresponding single hash table with the same number of entries and buckets.

It will be appreciated that a hash table may be divided into any number of sub-hash tables. For purposes of this disclosure, example embodiments using two sub-hash tables are described. In other embodiments additional sub-hash tables may be implemented, where each sub-hash table uses a unique (e.g., orthogonal) hash function to generate bucket indexes.

For the key and data value 330 in FIG. 3, the key hashes to bucket 4 in the first logical hash table 305 and hashes to bucket 2 in the second logical hash table 307. In this situation, an insertion failure would not result as both entries in bucket 4 of the first hash table 305 are available, as is the left-most entry of bucket 2 in the second hash table. Any number of approaches may be used to select an entry in which to insert the key and data value 330. For instance, if a right-to-left approach is used, the key and data value 330 may be inserted in the left-most entry in bucket 2 of the second hash table 307. The same result would occur if a least-significant bit approach is used. If a least-full approach is used, the key and data value 330 may be inserted in one of the two entries of bucket 4 in the first hash table, which are both available in this example. The particular entry of bucket 4 that is selected may depend on the particular embodiment. For instance, a least-full, right-to-left approach may be used. In this situation, the key and data value 330 may be inserted in the right-most entry of bucket 4 in the first hash table 305. Of course, any number of other approaches for inserting keys and data values into available entries in a dual hash table may be used.

Figure 4:
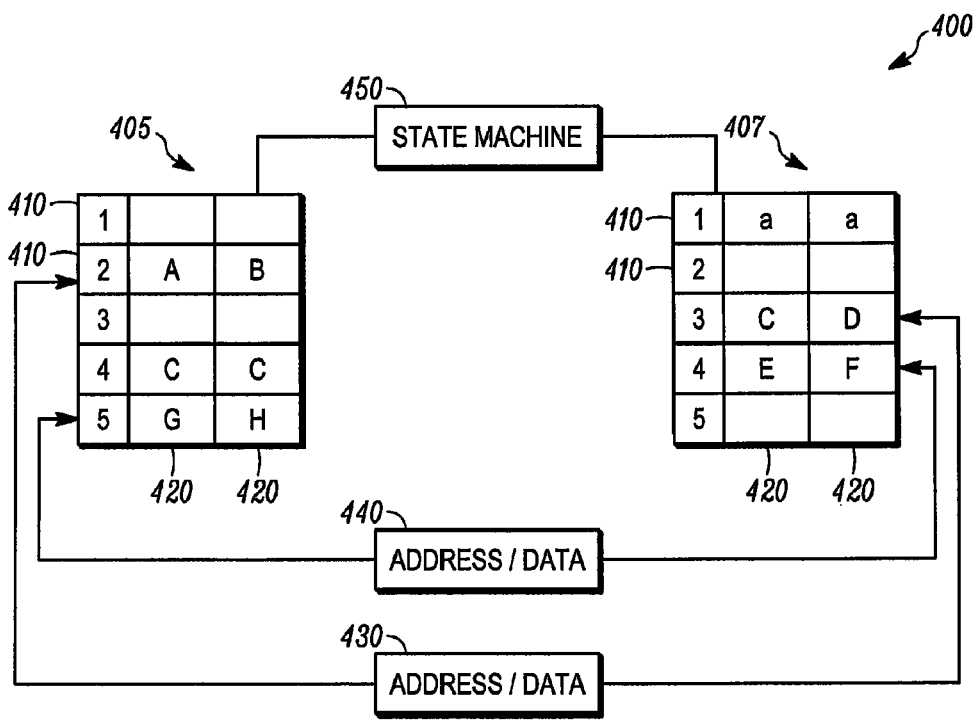
FIG. 4 is a block diagram illustrating an example approach for entry reordering in a dual hash table.

FIG. 4 is a block diagram illustrating an approach for entry reordering in a dual hash table 400. As with the dual hash table 300, the dual hash table 400 includes a first logical hash table 405 and a second logical hash table 407. Each of the hash tables 405 and 407 includes five buckets with two entries per bucket. Accordingly, the dual hash table 400 has twenty total entries.

The hash tables 405 and 407, as shown in FIG. 4, have eight total entries stored in them. The stored entries are designated with uppercase letters A-H. Also shown in FIG. 4 are the available entries in the buckets to which the key and data values designated 'A' and 'C' hashed to but were not selected due to the fact that the keys and data values (entries) 'A' and 'C' were inserted, respectively, in the other logical hash table. For instance, the entry 'A' is stored in bucket 2 of the first hash table. However, the entry 'A' also hashed to bucket 1 of the second hash table 407 but was inserted in the first hash table 405 instead of the second hash table 407.

In order to further improve the FMU and/or the AIU of a dual hash table as compared to a single hash table with the same number of entries and buckets, entry reordering may be performed to reduce the occurrence of insertion failures. Such reordering may be performed by only examining one level of entries. Alternatively, entry reordering may be done recursively over multiple levels of entries. Such approaches will now be described with respect to FIG. 4.

An example of single level entry reordering is illustrated in FIG. 4 by the insertion of an address and data value 430 in the dual hash table 400. In FIG. 4, the address and data value 430 is provided to the dual hash table 400 for insertion, with the address hashing to bucket 2 in the first hash table 405 and to bucket 3 in the second hash table 407.

As is shown in FIG. 4, bucket 2 of the first hash table 405 and bucket 3 of the second hash table 407 do not have any available entries. As a result, an insertion miss indication may occur in the dual hash table 400. As a result of this indication, a reordering state machine 450 may then attempt to reorder (rearrange) the entries of the dual hash table 400 in order to make an entry available for the address and data value 430. The state machine 450 may be implemented using hardware, software and/or firmware. In this situation, there are two possible entries that may be made available for the address and data value 430. For instance, entry 'A' may be moved from bucket 2 of the first hash table 400 to bucket 1 of the second hash table 407. The particular entry of bucket 1 of the second hash table 407 to which the state machine 450 may move the entry 'A' depends, at least in part, on the technique used to select an available entry.

Alternatively, the entry 'C' could be moved from bucket 3 of the second hash table 407 to bucket 4 of the first hash table 405. As with moving entry 'A', the particular entry of bucket 4 of the first hash table 405 to which the state machine 450 may move the entry 'C' depends, at least in part, on the technique used to select an available entry. Once either entry 'A' or 'C' is moved, the address and data value 430 may be entered in, respectively, bucket 2 of the first hash table 405 or bucket 3 of the second hash table 407 in the entry previously occupied by entry 'A' or 'C.'

An example of multiple level recursive entry reordering is also illustrated in FIG. 4 by the insertion of an address and data value 440 in the dual hash table 400. In FIG. 4, the address and data value 440 may be provided to the dual hash table 400 for insertion, with the address hashing to bucket 5 in the first hash table 405 and to bucket 4 in the second hash table.

As is shown in FIG. 4, bucket 5 of the first hash table 405 and bucket 4 of the second hash table 407 do not have any available entries. As a result, an insertion miss indication may occur in the dual hash table 400. As a result of this indication, the reordering state machine 450 may then attempt to reorder (rearrange) the entries of the dual hash table 400 in order to make an entry available for the address and data value 440. In this situation, it is assumed the entry 'G' in bucket 5 of the first hash table 405 also hashed to bucket 3 of the second hash table 407. As shown in FIG. 4, bucket 3 of the second hash table 407 also does not have any available entries. Also, for purposes of this example, it is assumed that the entry 'H' in bucket 5 of the first hash table 405 also hashed to a full bucket in the second hash table 407. Likewise it is assumed that the entries 'E' and 'F' in bucket 4 of the second hash table 407 also hashed to full buckets in the first hash table 405.

In this example, if single level reordering were performed by the state machine 450, an insertion failure would result, thus decreasing the utilization efficiency of the dual hash table 400. However, if recursive reordering is performed, an entry may be made available for inserting the address and data value 440. As indicated above, none of the entries in bucket 5 of the first hash table and bucket 4 of the second hash table may be directly moved to the other hash table. However, after reading each entry and determining the buckets in the other, non-selected hash table to which the entries hash, the state machine 450 may then recursively search the entries in each of those buckets to determine if there is an available entry to which one of the second level entries can be moved. If an available entry is found, the state machine 450 may then recursively reorder the entries in order to make and entry available for insertion of the address and data value 440.

In this example, it was assumed that the entry G in bucket 5 of the first hash table 405 also hashed to bucket 3 in the second hash table 407. Further, as was discussed above, the entry 'C' in bucket 3 of the second hash table 407 also hashed to bucket 4 of the first hash table 405. In this situation, the state machine 450 may move the entry 'C' from bucket 3 of the second hash table 407 to bucket 4 of the first hash table. The state machine 450 may then move the entry 'G' from bucket 5 of the first hash table 405 to the entry in bucket 3 of the second hash table 407 that was previously occupied by the entry 'C.' The address and data value 440 may then be inserted in the entry of bucket 5 in the first hash table 405 that was previously occupied by the entry 'G.' As a result, the FMU and AIU for the dual hash table 400 may be improved.

It will be appreciated that any number of levels may be recursively searched when performing entry reordering. It will also be appreciated approaches other than using the state machine 450 may be used to reorder entries in the dual hash table 400. For instance, an entry reordering software application may be used. It will be further appreciated that operations (such as those executed by a processor) that are used in managing a dual hash table may need to be modified so that it is clear which of the two logical hash tables, or both are being operated on. Such operations may include an INSERT command, a DELETE command and a LOOKUP command, as some examples. Such operations may be modified to include an extension to indicate on which of the hash tables a command is to operate. Such extensions may improve the efficiency of entry reordering implemented in software, for example.

Implementing the techniques described above may substantially improve the FMU and AIU efficiency of a hash table data structure. As an example, which assumes the use of random keys, a 16 k entry hash table with 8 entries per bucket and 2048 buckets may operate with a mean FMU of 26% and a mean AIU of 86%. Implementing a dual hash table by logically dividing the 16 k entry hash table into two sub-hash tables each with 2048 buckets and 4 entries per bucket and using a least-full method of selecting which sub-hash tables individual entries are inserted, the mean FMU may improve to 61% and the mean AIU may likewise improve to 92%. Further utilization improvements may be realized by implementing entry reordering. For instance, if two level reordering is implemented in the 16 k entry dual hash table discussed above, the mean FMU may improve to 69% and the mean AIU may improve to 92%. Furthermore, applying the foregoing techniques may produce a tighter statistical distribution of utilization efficiencies (i.e., smaller standard deviations across different sets of random keys).

Figure 5:
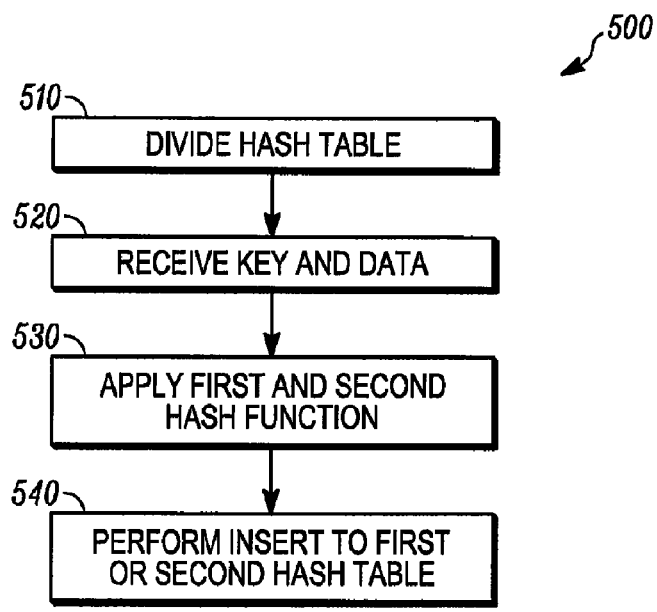
FIG. 5 is a flowchart illustrating an embodiment of a dual hash table management.

FIG. 5 is a flowchart illustrating an example method 500 for dual hash table management. The method 500 includes, at block 510, dividing a hash table data structure into a first logical hash table and a second logical hash table, such as in the fashion discussed above with respect to FIGS. 1 and 2, for example. At block 520, the method 500 includes receiving a key and a data value. As was discussed above, the key may take the form of a network address or any other unique identifier associated with the data value. At block 530, the method 500 includes applying first and second hash functions to the key to determine respective indexes to corresponding buckets in the first and second hash tables. As previously discussed, the first and second hash functions may be substantially mathematically orthogonal with respect to one another. At block 540, the method 500 includes inserting the key and data value in the first or second hash table.

Figure 6:
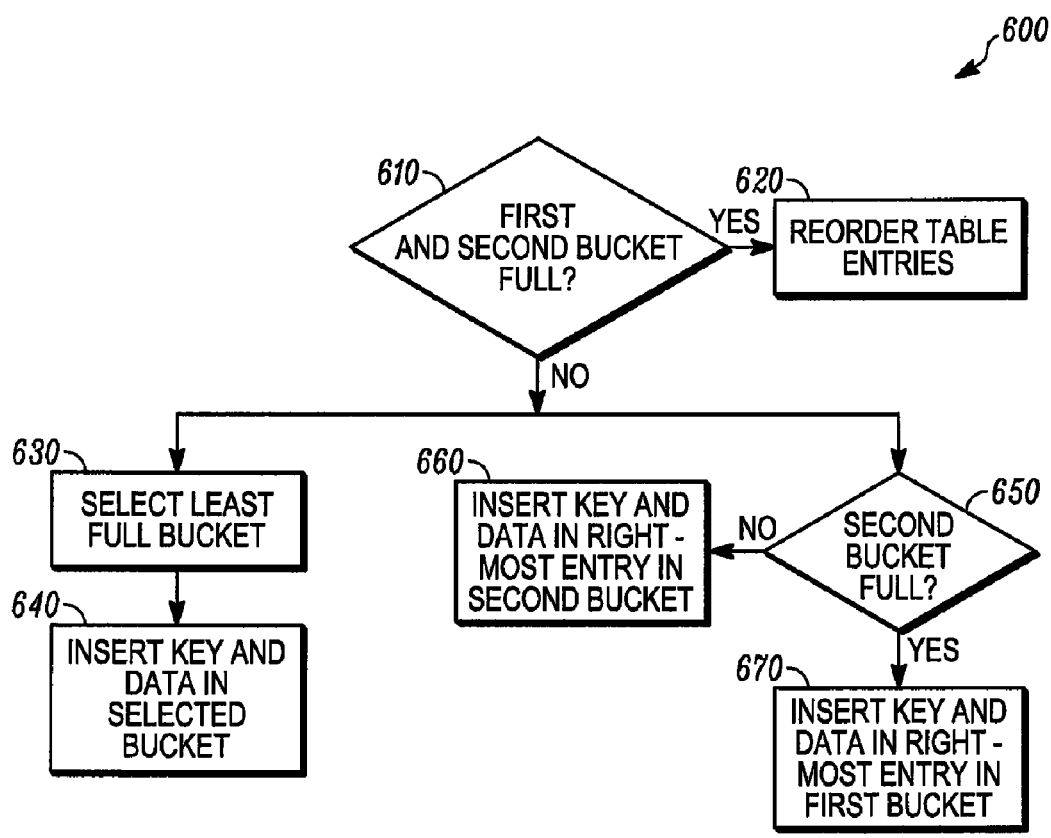
FIG. 6 is a flowchart illustrating embodiments of methods for inserting an entry into a dual hash table.

FIG. 6 is a flow chart illustrating an example method 600 for inserting an entry in a dual hash table. The method 600 may be implemented in place of block 540 in FIG. 5. The method 600 includes, at block 610, determining whether the first and second buckets corresponding with the bucket indexes produced by the first and second hash functions are full. If both buckets are full, the method 600 proceeds to block 620 where entry reordering may be performed, such as described above with respect to FIG. 4. If both the first and second buckets are not full, the method 600 may proceed on one of two parallel paths. For instance, the method 600 may proceed to block 630. At block 630, the least full bucket is selected. Alternatively, the least full hash table of the two hash tables may be selected. At block 640, the method 600 includes inserting the key and data value in the selected (least full) bucket.

If the first and second buckets are not both full, the method 600 may also proceed from block 610 to block 650 as an alternative to proceeding to block 630. At block 650, the method 600 may include determining if the second bucket is full. If the second bucket is not full, the method 600 may proceed to block 660 where the key and data value are inserted in the right-most available entry in the second bucket. If the second bucket is full at block 650, the method 600 may proceed to block 670 where the key and data value are inserted in the right-most available entry in the first bucket.

Figure 7:
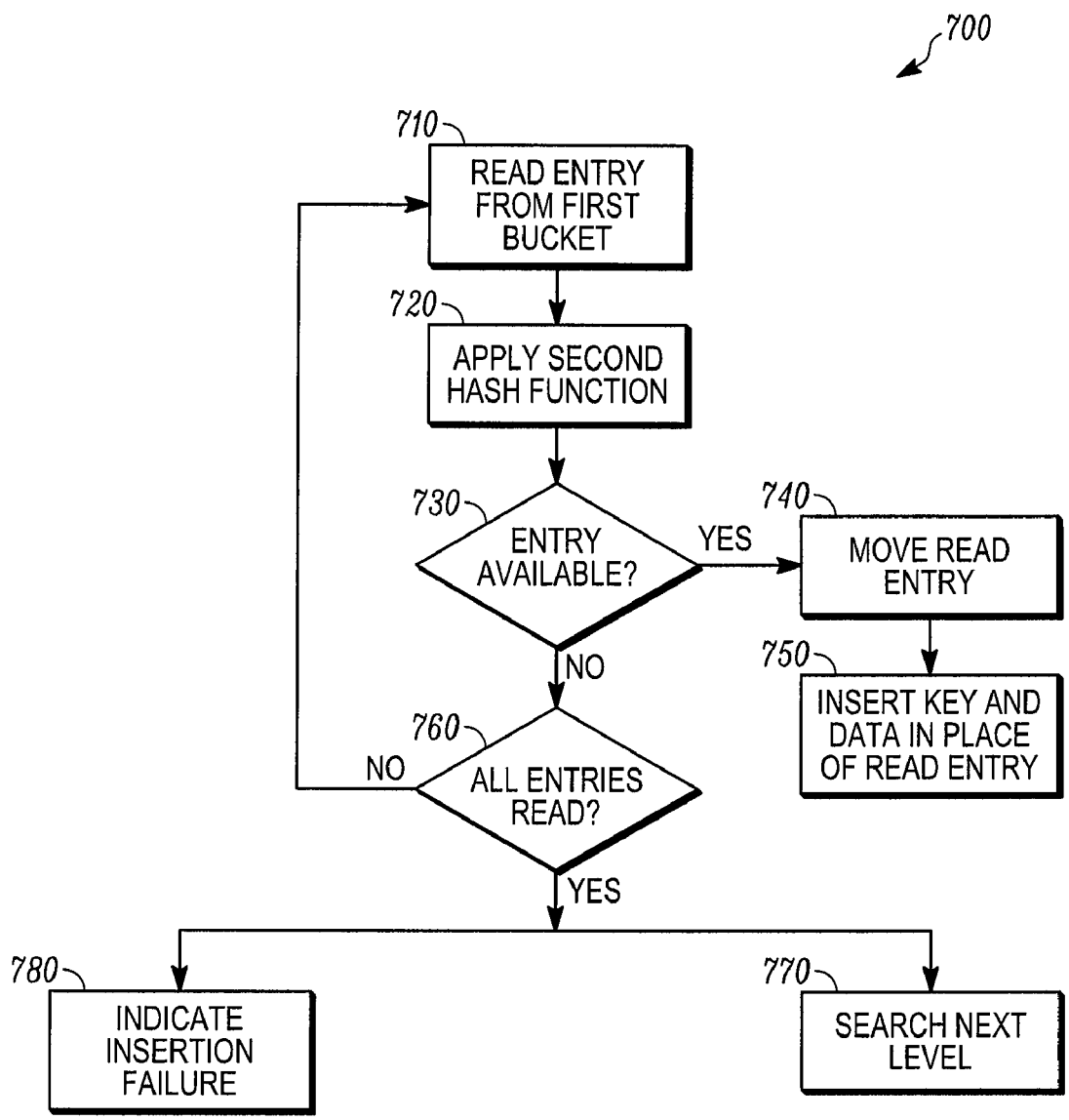
FIG. 7 is a flowchart illustrating an embodiment of a method for reordering entries in a dual hash table.

FIG. 7 is a flowchart illustrating a method 700 for entry reordering in a dual hash table. The method 700 may be implemented in place of block 620 in FIG. 6. In the method 700, at block 710, an entry is read from the first bucket in the first hash table. At block 720, the method includes applying the second hash function to determine the bucket index for the read entry in the second hash table (i.e., the index of the unselected bucket when the entry was inserted). At block 730, the method includes determining if an entry is available in the bucket corresponding with the bucket index determined at block 720. If an entry is available, the method 700 proceeds to block 730. At block 730, the read entry may be moved to the available entry in the second hash table that was identified at block 730. Further, at block 750, the key and data value may be inserted in the first hash table in place of the entry that was moved to the second hash table at block 740.

If it is determined that an entry is not available at block 730, the method 700 may proceed to block 760. At block 760, a determination is made whether all entries in the first bucket have been read. If all entries have not been read, the method 700 returns to block 710 and the next entry is read and the operations of blocks 720 to 760 may be repeated. If an available entry is not found using the entries of the first bucket, the method 700 may then be applied to the second bucket to determine if first level reordering may be performed. If an available entry is not found, the method 700 may then proceed on one of two paths. First, the method 700 may proceed to block 770 where the next level is recursively searched to locate an available entry. Alternatively, the method 700 may proceed to block 780 where an insertion failure may be indicated, such as to a processor in which the dual hash table is implemented.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:
1. A system comprising:
a first logical hash table;
a second logical hash table, wherein the first logical hash table and the second logical hash table are logically equivalent; and a non-transitory, machine-readable medium having machine executable instructions stored therein, the instructions, when executed, provide for:
  receiving a key and a corresponding data value;
  applying a first hash function to the key to produce a first index to a first bucket in the first hash table;
  applying a second hash function to the key to produce a second index to a second bucket in the second hash table;
  determining if the second bucket is full;
  in the event the second bucket is not full, inserting the key and the data value in a logically right-most available entry in the second bucket; and
  in the event the second bucket is full:
    determining if the first bucket is full;
    in the event the first bucket is not full, inserting the key and the data value in a logically right-most available entry in the first bucket; and
    in the event the first bucket is full, indicating an insertion miss.

2. The system of claim 1, a state machine that, responsive to the insertion miss indication, is configured to:
  recursively search entries of the first hash table and the second hash table based on respective keys of entries in the first bucket and the second bucket to identify an available entry in the first hash table or the second hash table;
  in the event an available entry is identified, recursively move one or more entries between the first hash table and the second hash table so as to make an entry available in the first bucket or the second bucket for storing the key and the data value; and
  in the event an available entry is not identified, indicate an insertion failure.

3. A method comprising:
  logically dividing, by a processor, a hash table data structure into a first hash table and a second hash table, wherein the first hash table and the second hash table are substantially logically equivalent; receiving a key and a corresponding data value;
  applying a first hash function to the key to produce a first index to a first bucket in the first hash table; and
  applying a second hash function to the key to produce a second index to a second bucket in the second hash table,
  determining whether both the first bucket and the second bucket are full;
  in the event both the first bucket and the second bucket are not full,
  selecting a least full bucket of the first bucket and the second bucket for insertion of the key and the data value; and
  in the event both the first bucket and the second bucket are full:
  recursively searching entries of the first hash table and the second hash table based on respective keys of entries in the first bucket and the second bucket to identify an available entry in the first hash table or the second hash table;
  in the event an available entry is identified, recursively moving one or more entries between the first hash table and the second hash table so as to make an entry available in the first bucket or the second bucket for storing the key and the data value; and
  in the event an available entry is not identified, indicating an insertion failure.

4. The method of claim 3, wherein the second hash function is substantially mathematically orthogonal to the first hash function.

5. The method of claim 4, wherein the first hash function is a CRC32 hash function and the second hash function is a CRC16 hash function.

6. The method of claim 3, wherein the key is one of a Media Access Controller address; a network unicast address and a network multicast address.

7. A method comprising:
  receiving, at a hash table structure, a key and a corresponding data value, the hash table data structure including logically equivalent first and second hash tables;
  applying, by a processor, a first hash function to the key to produce a first index to a first bucket in the first hash table; and
  applying a second hash function to the key to produce a second index to a second bucket in the second hash table,
  determining whether both the first bucket and the second bucket are full; in the event that both the first bucket and the second bucket are full, indicating an insertion miss; and
  in the event that both the first bucket and the second bucket are not full:
    selecting one of the first bucket and the second bucket for insertion of the key and the data value, the selection being based on one or more operating parameters of the first hash table and the second hash table;
    in the event the first bucket is selected, inserting the key and the data value in a logically right-most available entry in the first bucket; and
    in the event the second bucket is selected, inserting the key and the data value in a logically right-most available entry in the second bucket.

8. The method of claim 7, wherein a least full bucket of the first bucket and the second bucket is selected for insertion of the key and the data value.

9. The method of claim 7, wherein selecting one of the first bucket and the second bucket comprises:
  determining if the second bucket is full,
  in the event the second bucket is not full, inserting the key and the data value in the logically right-most available entry in the second bucket; and
  in the event the second bucket is full, inserting the key and the data value in the logically right-most available entry in the first bucket.

10. The method of claim 7, further comprising, responsive to the insertion miss indication:
  recursively searching entries of the first hash table and the second hash table based on respective keys of entries in the first bucket and the second bucket to identify an available entry in the first hash table or the second hash table;
  in the event an available entry is identified, recursively moving one or more entries between the first hash table and the second hash table so as to make an entry available in the first bucket or the second bucket for storing the key and the data value; and
  in the event an available entry is not identified, indicating an insertion failure.

11. The method of claim 7, wherein the second hash function is mathematically orthogonal to the first hash function.

12. The method of claim 7, wherein the first hash function is a CRC32 hash function and the second hash function is a CRC16 hash function.

13. The method of claim 7, wherein the key is one of a Media Access Controller address; a network unicast address and a network multicast address.

14. The method of claim 7, further comprising, responsive to the insertion miss indication:
   (a) reading an entry from the first bucket based on the first index;
   (b) applying the second hash function to a key of the read entry to determine a corresponding bucket index in the second hash table;
   (c) determining whether the bucket in the second hash table associated with the corresponding bucket index has an available entry;
   (d) in the event the bucket in second hash table associated with the corresponding bucket index has an available entry:
      moving the read entry from the first bucket to the available entry; and
      inserting the key and the data value in the first bucket in place of the read entry;
   (e) in the event the bucket in the second hash table associated with the corresponding bucket index does not have an available entry:
      reading a next entry from the first bucket; and
   (f) repeating steps (b)-(e) for each entry of the first bucket until one of:
      an available entry is identified; and
      all entries in the first bucket have been read.

15. The method of claim 7, further comprising, responsive to the insertion miss indication:
   (a) reading an entry from the second bucket based on the second index;
   (b) applying the first hash function to a key of the read entry to determine a corresponding bucket index in the first hash table;
   (c) determining whether the bucket in the first hash table associated with the corresponding bucket index has an available entry;
   (d) in the event the bucket in first hash table associated with the corresponding bucket index has an available entry:
      moving the read entry from the second bucket to the available entry; and
      inserting the key and the data value in the second bucket in place of the read entry;
   (e) in the event the bucket in the first hash table associated with the corresponding bucket index does not have an available entry:
      reading a next entry from the second bucket; and
   (f) repeating steps (b)-(e) for each entry of the second bucket until one of:
      an available entry is identified; and
      all entries in the second bucket have been read.

16. The method of claim 7, further comprising, responsive to the insertion miss indication:
   determining a least recently used entry in the first bucket and the second bucket; and
   replacing the least recently used entry with the key and the data value.

* * * * *

UNITED STATES PATENT AND TRADEMARK OFFICE
CERTIFICATE OF CORRECTION

PATENT NO. : 8,266,116 B2
APPLICATION NO. : 11/845997
DATED : September 11, 2012
INVENTOR(S) : Puneet Agarwal et al.

It is certified that error appears in the above-identified patent and that said Letters Patent is hereby corrected as shown below:

In column 9, line 41, in claim 3, before "logically" delete "substantially".

In column 9, line 44, in claim 3, after "table;" delete "and".

In column 10, line 62, in claim 12, delete "claim 7," and insert -- claim 11, --, therefor.

Signed and Sealed this
Fifth Day of February, 2013

Teresa Stanek Rea
*Acting Director of the United States Patent and Trademark Office*